(12) United States Patent
Ohms et al.

(10) Patent No.: US 12,376,521 B2
(45) Date of Patent: Aug. 5, 2025

(54) AGRICULTURAL SYSTEM AND METHOD FOR DETERMINING CROP LOSS OF AN AGRICULTURAL HARVESTER

(71) Applicant: CNH Industrial America LLC, New Holland, PA (US)

(72) Inventors: Travis J. Ohms, Blue Grass, IA (US); James Seedorf, Lancaster, PA (US)

( * ) Notice: Subject to any disclaimer, the term of this patent is extended or adjusted under 35 U.S.C. 154(b) by 907 days.

(21) Appl. No.: 17/404,285

(22) Filed: Aug. 17, 2021

(65) Prior Publication Data
US 2023/0058693 A1 Feb. 23, 2023

(51) Int. Cl.
*A01D 41/127* (2006.01)
*G05B 19/4155* (2006.01)
*A01D 45/02* (2006.01)
*A01D 45/30* (2006.01)

(52) U.S. Cl.
CPC ..... *A01D 41/1275* (2013.01); *G05B 19/4155* (2013.01); *A01D 45/02* (2013.01); *A01D 45/30* (2013.01); *G05B 2219/45017* (2013.01)

(58) Field of Classification Search
CPC .... A01D 41/1275; A01D 45/02; A01D 45/30; G05B 19/4155; G05B 2219/45017
See application file for complete search history.

(56) References Cited

U.S. PATENT DOCUMENTS

| 4,036,065 | A | 7/1977 | Strelioff et al. |
| 4,902,264 | A | 2/1990 | Diekhans et al. |
| 9,474,208 | B2 | 10/2016 | Batcheller et al. |
| 10,729,065 | B2 | 8/2020 | Pfeiffer et al. |
| 2008/0318648 | A1 | 12/2008 | Baumgarten et al. |
| 2012/0043785 | A1* | 2/2012 | Mildner ............ B62D 25/082 296/193.02 |

(Continued)

FOREIGN PATENT DOCUMENTS

| CN | 110583217 A | 12/2019 |
| CN | 110622684 A | 12/2019 |

(Continued)

OTHER PUBLICATIONS

European Search Report for EP Application No. 22190402.2 dated May 3, 2023 (11 pages).

(Continued)

*Primary Examiner* — Adnan M Mirza
(74) *Attorney, Agent, or Firm* — Rebecca Henkel; Rickard K. DeMile; Peter K. Zacharias (57) ABSTRACT

An agricultural system for determining crop loss of an agricultural harvester may include a support beam extending along a lateral direction between first and second lateral ends, and one or more impact sensors supported on the support beam. Each of the one or more impact sensors is configured to generate data indicative of a crop impact location of each crop impact of a plurality of crop impacts on the support beam between the first and second lateral ends. Additionally, the agricultural system may include a computing system communicatively coupled to the one or more impact sensors, where the computing system is configured to determine the crop impact location of each crop impact of the plurality of crop impacts on the support beam between the first and second lateral ends based at least in part on the data from the one or more impact sensors.

11 Claims, 6 Drawing Sheets

(56) References Cited

U.S. PATENT DOCUMENTS

| | | | |
|---|---|---|---|
| 2014/0135082 A1 | 5/2014 | Batcheller et al. | |
| 2016/0025531 A1* | 1/2016 | Bischoff | G01L 1/146 |
| | | | 73/861.73 |
| 2016/0084813 A1* | 3/2016 | Anderson | G01N 33/025 |
| | | | 702/5 |
| 2021/0088691 A1 | 3/2021 | Ferren et al. | |

FOREIGN PATENT DOCUMENTS

| | | |
|---|---|---|
| DE | 2448745 A1 | 4/1976 |
| EP | 0339142 A1 | 11/1989 |
| EP | 0883983 A1 | 12/1998 |
| EP | 1759574 A2 | 3/2007 |
| EP | 1832863 A2 | 9/2007 |
| EP | 2005813 A1 | 12/2008 |
| GB | 2103796 A | 2/1983 |
| WO | WO 2020/126307 | 6/2020 |

OTHER PUBLICATIONS

Extended European Search Report for EP Application 22190402.2 dated Dec. 15, 2022 (10 pages).

* cited by examiner

AGRICULTURAL SYSTEM AND METHOD FOR DETERMINING CROP LOSS OF AN AGRICULTURAL HARVESTER

FIELD OF THE INVENTION

The present disclosure relates generally to agricultural harvesters and, more particularly, to agricultural systems and methods for determining crop loss of an agricultural harvester.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing. The harvester also includes a crop processing system, which performs various processing operations (e.g., threshing, separating, cleaning, etc.) of the harvested crop received from the harvesting implement.

In certain instances, the crop processing system settings may cause "crop loss," where crop is exhausted with material other than grain (MOG) from the harvester. Existing systems for monitoring crop loss only determine an estimated volume of crop loss. However, without knowing the location of the crop loss, it is unclear which settings of the crop processing system need adjustment.

Accordingly, an improved agricultural system and method for determining crop loss of an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for determining crop loss of an agricultural harvester. The agricultural system includes a support beam extending along a lateral direction between a first lateral end and a second lateral end of the support beam, and one or more impact sensors supported on the support beam. Each of the one or more impact sensors is configured to generate data indicative of a crop impact location of each crop impact of a plurality of crop impacts on the support beam between the first and second lateral ends. Additionally, the agricultural system includes a computing system communicatively coupled to the one or more impact sensors, where the computing system is configured to determine the crop impact location of each crop impact of the plurality of crop impacts on the support beam between the first and second lateral ends based at least in part on the data from the one or more impact sensors.

In another aspect, the present subject matter is directed to an agricultural method for determining crop loss of an agricultural harvester. The agricultural method includes receiving, with a computing system, data from one or more impact sensors supported on a support beam, where the support beam extends along a lateral direction between a first lateral end and a second lateral end of the support beam. The data is indicative of a crop impact location of each crop impact of a plurality of crop impacts on the support beam between the first and second lateral ends. The agricultural method further includes determining, with the computing system, the crop impact location of each crop impact of the plurality of crop impacts on the support beam between the first and second lateral ends based at least in part on the data from the one or more impact sensors. Additionally, the agricultural method includes controlling, with the computing system, an operation of the agricultural harvester based at least in part on the crop impact locations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for determining crop loss of an agricultural harvester. Specifically, in several embodiments, the disclosed system includes one or more impact sensors supported on a support beam positioned proximate a MOG outlet of the agricultural harvester, with the impact sensor(s) being configured to generate data indicative of crop impacts (i.e., crop losses) along a lateral width of the support beam between first and second lateral ends of the support beam. For instance, in one embodiment, a first impact sensor is positioned proximate the first lateral end of the support beam and a second impact sensor is positioned proximate the second lateral end of the support beam. The data from the first and second impact sensors is indicative of a time of detection for each of the crop impacts on the support beam. As such, the time of detection associated with each, respective crop impact relative to the first impact sensor and relative to the second impact sensor may be compared to determine if the respective crop impact is closer to the first impact sensor (and the first lateral end of the support beam), closer to the second impact sensor (and the second end of the support beam), or essentially equidistant to both impact sensors (close to a center of the support beam). In another embodiment, the support beam may have a tapering profile such that each location along the support beam is associated with a different frequency. Thus, a single sensor may be used to determine the frequency of each crop impact, which may then be correlated to a corresponding frequency associated with a particular location along the support beam.

Once the locations of the crop impacts are determined, an operation of the agricultural harvester may be actively adjusted to reduce crop loss. For instance, a distribution of the locations of the crop impacts along the support beam may indicate whether the crop losses occur more frequently toward one lateral end of the support beam or toward the center of the support beam. If the crop losses occur more frequently toward one lateral end of the support beam, the leveling of the cleaning assembly may be adjusted. Similarly, if the crop losses occur more frequently toward the center of the support beam, an operation of the rotor and/or concaves may be adjusted.

Figure 1:
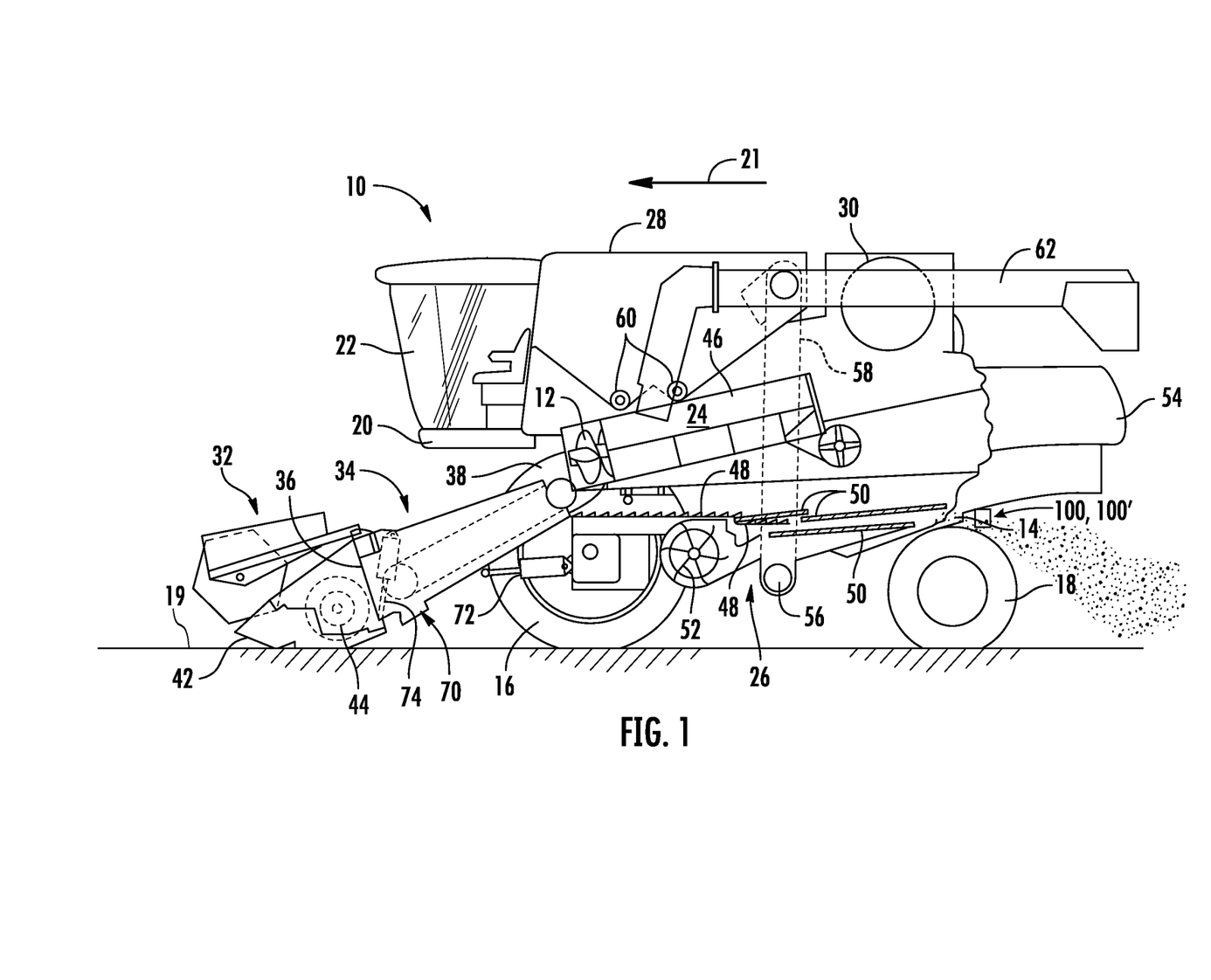
FIG. 1 illustrates a simplified, partial sectional side view of one embodiment of an agricultural harvester in accordance with aspects of the present subject matter.

Referring now to the drawings, FIG. 1 illustrates a simplified, partial sectional side view of one embodiment of a work vehicle, such as an agricultural harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26 and a holding tank 28 may be supported by the frame 14. As is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

Figure 7:
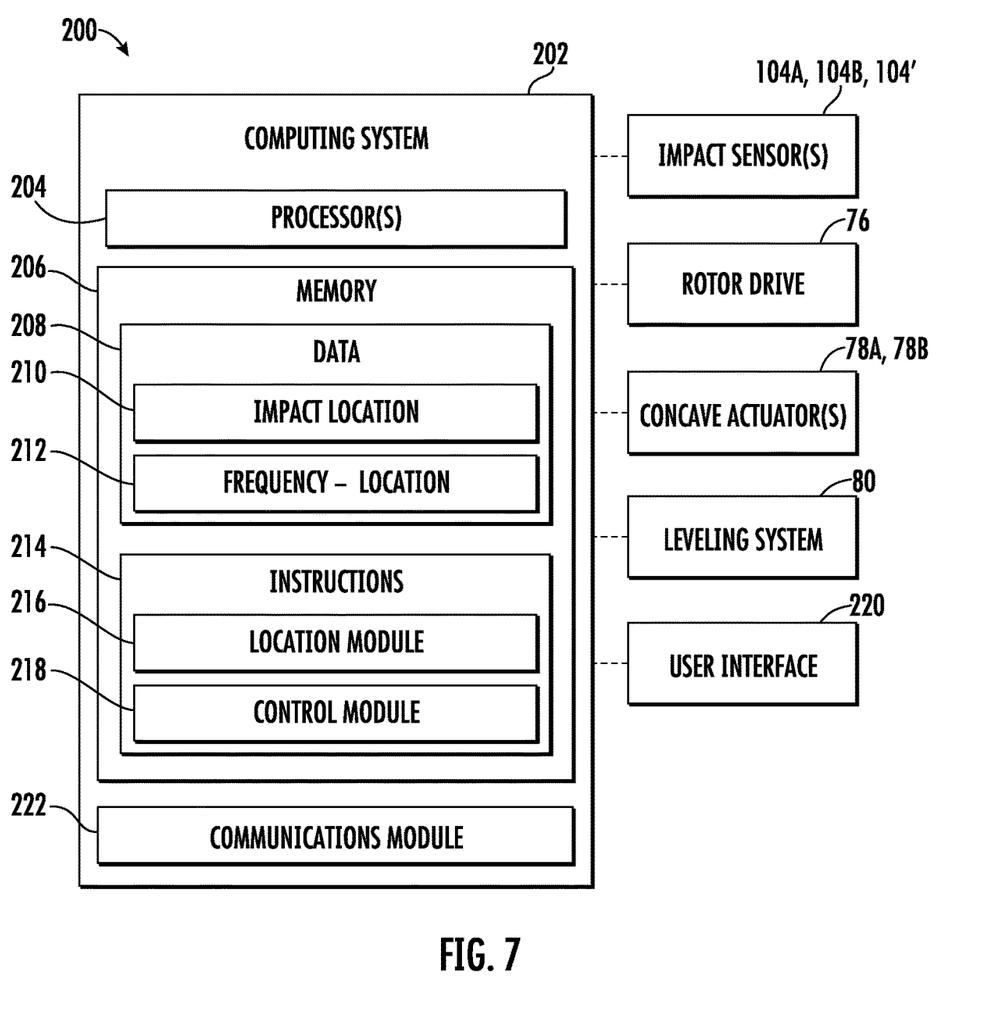
FIG. 7 illustrates a schematic view of a system for determining crop loss of an agricultural harvester in accordance with aspects of the present subject matter.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber or concave rotor cage 46 (hereinafter referred to as "concave 46") in which the rotor 12 is rotated by a rotor drive 76 (FIG. 7) to thresh and separate the crop received therein. That is, the crop is rubbed and beaten between the rotor 12 and the inner surfaces of the concave 46, whereby the grain, seed, or the like, is loosened and separated from the straw or MOG. In some embodiments, a position of the concave 46 about the rotor axis (e.g., a distance from the rotor axis) may be adjustable by one or more first concave actuators 78A (FIG. 7) and/or an angle of vanes (not shown) within the concave 46 may be adjustable by one or more second concave actuators 78B (FIG. 7).

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10. In some embodiments, a leveling system 80 (FIG. 7) may be provided for adjusting the lateral positioning of the cleaning assembly 48, 50. For instance, when the agricultural harvester 10 is a on a hill such that a one lateral side of the agricultural harvester 10 is positioned higher than its other lateral side, one or more actuators of the leveling system 80 may adjust the lateral positioning or angle of the pans 48 and/or the sieves 50 to counteract such sloping and keep the pans 48 and sieves 50 level.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 70 which is configured to adjust a height of the header 32 relative to the ground surface 19 so as to maintain the desired cutting height between the header 32 and the ground surface 19. The hydraulic system 70 may include a height actuator 72 (e.g., a fluid-actuated cylinder) configured to adjust the height or vertical positioning of the header 32 relative to the ground. For example, in some embodiments, the height actuator 72 may be coupled between the feeder 34 and the frame 14 such that the height actuator 72 may pivot the feeder 34 to raise and lower the header 32 relative to the ground 19. In addition, the hydraulic system 70 may include a tilt actuator(s) 74 (e.g., a fluid-actuated cylinder) coupled between the header 32 and the feeder 34 to allow the header 32 to be tilted relative to the ground surface 19 or pivoted laterally or side-to-side relative to the feeder 34.

Additionally, in accordance with aspects of the present subject matter, the harvester 10 may include a crop loss sensing assembly 100 supported relative to a MOG outlet region of the harvester 10. For instance, as will be described in greater detail below, the crop loss sensing assembly 100, 100' may include a support beam extending laterally adjacent to a MOG outlet at a rear end of the harvester 10, and one or more impact sensor(s) positioned on the support beam. In general, crop inadvertently exhausted from the harvester 10 with MOG separated by the threshing and separating assembly 24 and the sieves 50 may impact the support beam before dropping down to the field. The impact sensor(s) may be configured to generate data indicative of each of the crop impacts, particularly indicative of a location of each of the crop impacts along a lateral width of the support beam. Using the locations of the crop impacts determined from the data generated by the impact sensor(s), adjustment(s) may be made to the operation of the harvester 10 to reduce crop losses.

Figure 2:
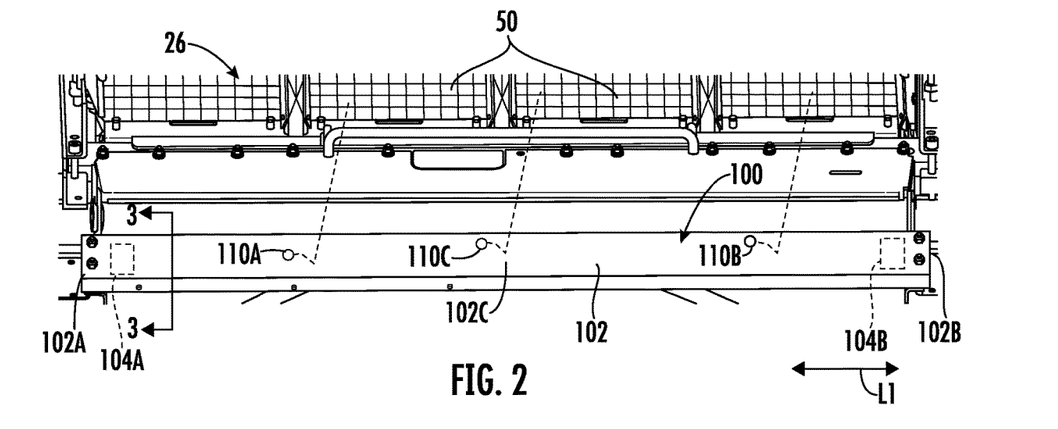
FIG. 2 illustrates a rear view of one embodiment of a sensing assembly for determining crop loss of an agricultural harvester in accordance with aspects of the present subject matter.
Figure 3:
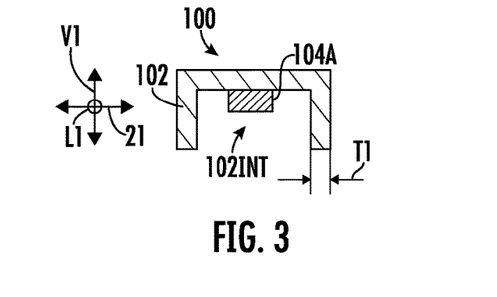
FIG. 3 illustrates a section view of the sensing assembly shown in FIG. 2 taken with respect to section line 3-3 in FIG. 2 in accordance with aspects of the present subject matter.

Referring now to FIGS. 2 and 3, various views of one embodiment of a sensing assembly 100 for determining crop loss of an agricultural harvester (e.g., harvester 10) are illustrated in accordance with aspects of the present subject matter. Particularly, FIG. 2 illustrates a rear view of one embodiment of the sensing assembly 100 and FIG. 3 illustrates a section view of the sensing assembly shown in FIG. 2 taken with respect to section line 3-3 in FIG. 2.

As indicated above, the sensing assembly 100 is supported relative to a MOG outlet region of the harvester 10, such as an outlet downstream of the sieves 50 of the harvester 10, at a rear end of the harvester 10. The sensing assembly 100 includes a support beam 102 and two impact sensors, including a first impact sensor 104A and a second impact sensor 104B. The support beam 102 extends in the lateral direction L1 between a first lateral end 102A and a second lateral end 102B. The first impact sensor 104A is supported on the support beam 102 proximate the first lateral end 102A and the second impact sensor 104B is supported on the support beam 102 proximate the second lateral end 102B such that the second impact sensor 104B is spaced apart from the first impact sensor 104A. In one embodiment, the impact sensors 104A, 104B are equidistant from a center 102C of the support beam 102. Further, as particularly shown in FIG. 3, in one embodiment, the support beam 102 has a constant, "c-shaped" cross-sectional profile across the lateral width of the support beam 102 which forms an internal recess 102INT. The impact sensors 104A, 104B are supported on the support beam 102 within the recess 102INT. For instance, the impact sensors 104 may be mounted within the recess 102INT to an upper wall of the recess 102INT along a vertical direction V1. However, the impact sensors 104A, 104B may be positioned at any other suitable location along and/or on the support beam 102.

The impact sensors 104A, 104B are configured to generate data indicative of the crop impact location of crop impacts of crop (e.g., crop 110) on the support beam 102. For instance, each crop impact sensor 104 may include an acoustic sensor, a vibration sensor, and/or any other suitable sensor. The data generated by the impact sensors 104A, 104B is indicative of a magnitude of each impact on the support beam 102 (of crop and/or MOG) and a time instance at which the impact occurs. For instance, the data generated by the first impact sensor 104A includes a first time instance for each crop impact, indicating the detection time at which the crop impact was detected by the first impact sensor 104A. Similarly, the data generated by the second crop impact sensor 104B comprises a second time instance for each crop impact on the support beam 102, indicating the detection time at which the crop impact was detected by the second impact sensor 104B.

As will be described in further detail below, the crop impact location of a crop impact may be determined by comparing the first and second time instances for the respective crop impact. For instance, a crop impact, such as a crop impact of a first crop 110A in FIG. 2, is determined to be closer to the first lateral end 102A of the support beam 102 than the second lateral end 102B of the support beam 102 when the first time instance associated with the respective crop impact is earlier than the second time instance associated with the respective crop impact. Conversely, a crop impact, such as a crop impact of a second crop 110B in FIG. 2, is determined to be closer to the second lateral end 102B of the support beam 102 than the first lateral end 102A of the support beam 102 when the second time instance associated with the respective crop impact is earlier than the first time instance associated with the respective crop impact. A crop impact, such as a crop impact of a third crop 110C in FIG. 2, is determined to be centered between the first and second lateral ends 102A, 102B, at the center 102C of the support beam 102, when the first and second time instances associated with the respective crop impact are substantially the same.

The above described sensing assembly 100 advantageously only requires two sensors 104 supported on the single support beam 102 for determining the locations of crop loss along the lateral width of the support beam 102, which reduces costs for such system. However, it should be appreciated that any other suitable number of impact sensors 104 may be used with the sensing assembly 100, such as three or more impact sensors 104.

Figure 4:
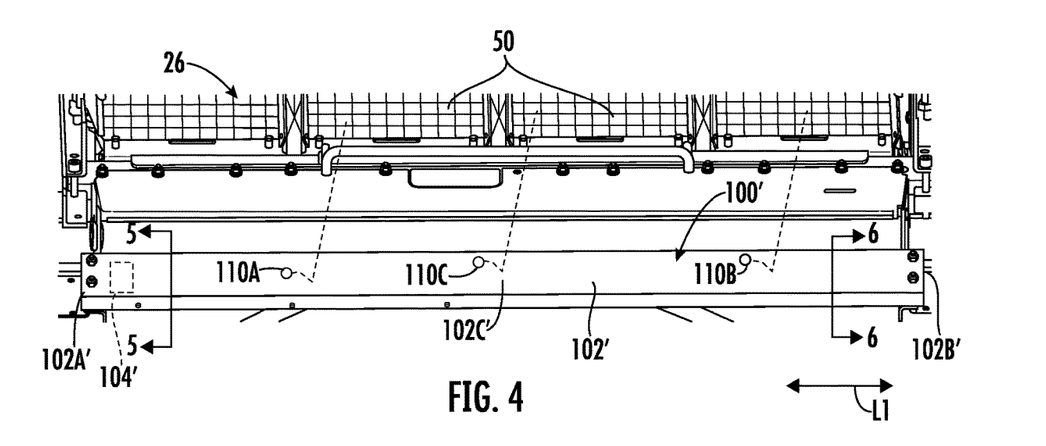
FIG. 4 illustrates a rear view of another embodiment of a sensing assembly for determining crop loss of an agricultural harvester in accordance with aspects of the present subject matter.
Figure 5:
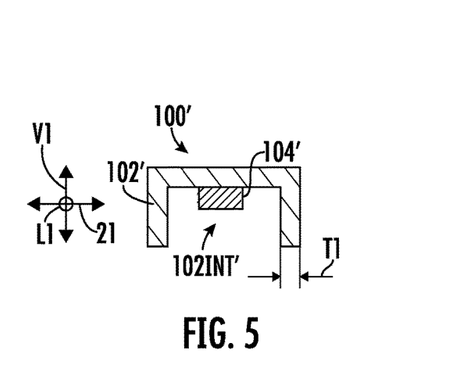
FIG. 5 illustrates a section view of the sensing assembly shown in FIG. 4 taken with respect to section line 5-5 in FIG. 4 in accordance with aspects of the present subject matter.
Figure 6:
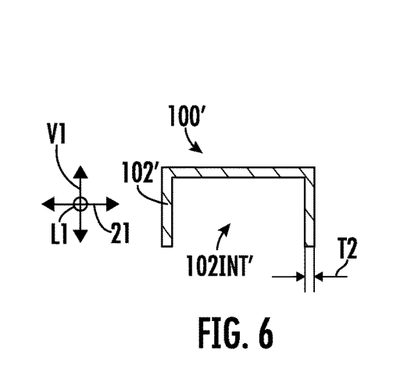
FIG. 6 illustrates another section view of the sensing assembly shown in FIG. 4 taken with respect to section line 6-6 in FIG. 4 in accordance with aspects of the present subject matter.

Referring now to FIGS. 4-6, various views of another embodiment of a sensing assembly 100' for determining crop loss of an agricultural harvester (e.g., harvester 10) are illustrated in accordance with aspects of the present subject matter. Particularly, FIG. 4 illustrates a rear view of the sensing assembly 100', FIG. 5 illustrates a section view of the sensing assembly shown in FIG. 4 taken with respect to section line 5-5 in FIG. 4, and FIG. 6 illustrates another section view of the sensing assembly shown in FIG. 4 taken with respect to section line 6-6 in FIG. 4.

Similar to the sensing assembly 100 described above with reference to FIGS. 2 and 3, the sensing assembly 100' of FIGS. 4-6 is also supported relative to a MOG outlet region of the harvester 10, such as an outlet downstream of the sieves 50 of the harvester 10, at a rear end of the harvester 10. The sensing assembly 100' includes a support beam 102' extending in the lateral direction L1 between a first lateral end 102A' and a second lateral end 102B', but includes only a single impact sensor 104'. The impact sensor 104' is supported on the support beam 102' at any suitable location along the support beam 102' (e.g., proximate the first end 102A', proximate the second end 102B', or at a center 102C' of the support beam 102'). Further, as particularly shown in FIGS. 5 and 6, in one embodiment, the support beam 102' has a "c-shaped" cross-sectional profile forming an internal recess 102INT'. The impact sensor 104' is supported on the support beam 102' within the recess 102INT', such as on an upper surface of the internal recess 102INT' along the vertical direction V1. The impact sensor 104' is configured to generate data indicative of the crop impact location of crop impacts of crop (e.g., crop 110) on the support beam 102'. For instance, the impact sensor 104 may include an acoustic sensor, a vibration sensor, and/or any other suitable sensor. The data generated by the impact sensor 104' is indicative of a frequency associated with each impact on the support beam 102 (of crop and/or MOG).

The support beam 102' has a tapering profile along the lateral direction between the first and second lateral ends 102A', 102B' of the support beam 102'. For instance, as shown between FIGS. 5 and 6, the c-shaped cross-sectional profile of the support beam 102' tapers along the lateral direction. For example, in one embodiment, a thickness of a material of the support beam 102' tapers along the lateral direction from a first thickness T1 (FIG. 5) proximate the first lateral end 102A' of the support beam 102 to a second thickness T2 (FIG. 6) proximate the second lateral end 102B' of the support beam 102'. However, it should be appreciated that, in some embodiments, the profile of the support beam 102' may be varied in any other suitable manner. By tapering the support beam 102', different locations on the support beam 102' along the lateral direction L1 are associated with different frequencies. For instance, a crop impact at a first location along the support beam 102', such as a crop impact of the first crop 110A in FIG. 4, is associated with a first frequency response, a crop impact at a second location along the support beam 102', such as a crop impact of the second crop 110B in FIG. 4, is associated with a second frequency response, and a crop impact at a third location along the support beam 102', such as a crop impact of the third crop 110C in FIG. 4, is associated with a third frequency response, even when the different impacts have the same magnitude of impact.

Thus, as will be described below in greater detail, the crop impact locations on the support beam may be determined by correlating the crop impact frequency for each crop impact to the different frequencies of the different locations on the support beam. For instance, in some embodiments, an expected frequency response is known for each location along the lateral width of the support beam 102' (e.g., at every 0.5 centimeter, 1 centimeter, 1.5 centimeters, 2 centimeters, and/or the like), such that when a crop impact is detected, the frequency associated with the crop impact may be compared to the known frequency responses along the support beam 102' to determine the location of the crop impact along the support beam 102'. In some embodiments, an expected frequency response is only known for a few locations along the lateral width of the support beam 102', such as proximate the first lateral end 102A' and proximate the second lateral end 102B', so a linear or logarithmic equation may be used to determine the location of the crop impact along the support beam 102' for any location between the first and second lateral ends 102A', 102B'.

The above described sensing assembly 100' advantageously only requires one impact sensor 104' supported on the single support beam 102' for determining the locations of crop loss along the lateral width of the support beam 102', which further reduces costs for such system. However, it should be appreciated that any other suitable number of impact sensors 104' may be used with the sensing assembly 100', such as two or more impact sensors 104'.

Referring now to FIG. 7, a schematic view of one embodiment of a control system 200 for determining crop loss of an agricultural harvester is illustrated in accordance with aspects of the present subject matter. In general, the control system 200 will be described herein with reference to the harvester 10 described with reference to FIG. 1 and the crop loss sensing assembly(ies) 100, 100' described with reference to FIGS. 2-6. However, it should be appreciated that the disclosed control system 200 may be used with any suitable agricultural work vehicle having any other suitable vehicle configuration and/or with a sensing assembly having any other suitable configuration.

As shown, the control system 200 may include any combination of components of the harvester 10 and sensing assembly(ies) 100, 100' described above with reference to FIGS. 1-6. For instance, the system 200 may include: the rotor drive 76 for controlling a rotational speed of rotor 12; the concave actuator(s) 78A, 78B for controlling the position of the concave 46 and/or angle of vanes of the concave 46; the leveling system 80 for adjusting a position of the pans 48 and the sieves 50; and the impact sensor(s) 104A, 104B, 104' configured to generate data indicative of locations of crop impacts along the support beam 102, 102'.

Additionally, as shown in FIG. 7, the control system 200 may include a computing system 202 installed on and/or otherwise provided in operative association with the harvester 10. In general, the computing system 202 may correspond to any suitable processor-based device(s), such as a computing device or any combination of computing devices. Thus, in several embodiments, the computing system 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the computing system 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the control algorithms and/or methods described herein.

In one embodiment, the memory 206 of the computing system 202 may include one or more databases for storing information associated with the operation of the harvester 10, including data 208 associated with determining the crop-loss locations of the harvester 10. For instance, as shown in FIG. 7, the memory 206 may include an impact location database 210 for storing data associated with the location of crop impacts on the support beam 102, 102' provided by the impact sensor(s) 104A, 104B, 104'. Specifically, the computing system 202 may be communicatively coupled to each impact sensor 104A, 104B, 104' to allow the data indicative of the crop impact locations generated by the sensor(s) 104A, 104B, 104' to be transmitted to the computing system 202. As such the computing system 202 may be configured to continuously monitor and store the data indicative of the crop impact locations.

Additionally, the memory 206 of the computing system 202 may include a frequency-location database 212 for storing data indicative of and/or relationships for calculating the frequencies associated with different lateral locations along the support beam 102' having the varying cross-sectional profile. Such correlation(s) between lateral position of the support beam 102' and frequency response may be predetermined and supplied to the memory 206 of the computing system 202 in any suitable manner.

Referring still to FIG. 7, in several embodiments, the memory 206 of the computing system 202 may store instructions 214 that, when executed by the processor(s) 204, configure the computing system 202 to execute a location module 216 to determine the locations of crop impacts across the support beam 102, 102' based on the impact location data 210 from the impact sensor(s) 104A, 104B, 104'. Specifically, in embodiments where the data 210 is received from the first and second impact sensors 104A, 104B associated with the support beam 102, the location module 216 may be configured to determine the location of each crop impact based at least in part on a comparison of (e.g., a differential between) a first time instance for each, respective crop impact relative to the first impact sensor 104A and a second time instance for each, respective crop impact on the support beam relative to the second impact sensor 104B. The comparison between the first and second instances may generally indicate the location of a crop impact. For instance, if the comparison between the first and second time instances indicates that the first sensor 104A detected a respective crop impact first, the crop impact location is closer to the first sensor 104A than the second sensor 104B, and closer to the first lateral end 102A of the support beam 102. Conversely, if the comparison between the first and second time instances indicates that the second sensor 104B detected a respective crop impact first, the crop impact location is closer to the second sensor 104B than the first sensor 104A, and closer to the second lateral end 102B of the support beam 102. Alternatively, if the comparison between the first and second time instances indicates that the first and second sensors 104A, 104B detected a respective crop impact at the same time, the crop impact location is determined to be equidistant or centered between the first and second sensors 104A, 104B, at a center 102C of the support beam 102. However, in other embodiments, the first and second time instances may instead be used to determine the exact location of a respective crop impact, for instance using a linear equation, and/or the like, when the positions of the sensor(s) 104A, 104B relative to the lateral ends 102A, 102B of the support beam 102 are known.

In other embodiments, where the data 210 is received from the impact sensor 104' associated with the support beam 102' having the tapering profile, the location module 216 may be configured to determine the location of each crop impact by correlating the crop impact frequency for each crop impact determined from the data 210 received from the impact sensor 104' to the different frequencies of the different locations on the support beam 102' mapped or mappable using the frequency-location data 212. For instance, the location module 216 may compare the frequency of each crop impact to frequencies of a table stored in the frequency-location database 212 correlating each location along the support beam 102' to a respective frequency, to determine the lateral location of each crop impact on the support beam 102'. Alternatively, or additionally, the location module 216 may input the frequency of each crop impact into a mathematical equation stored in the frequency-location database 212 for determining the lateral location along the support beam 102' of the respective crop impact.

In some instances, the location module 216 may further be configured to determine a distribution of the location of the crop impacts on the support beam 102, 102'. For example, referring now to FIGS. 8A-8C, various exemplary distribution graphs of crop loss of an agricultural harvester (e.g., harvester 10) are illustrated, particularly illustrating locations of crop impacts across the lateral width of the support beam 102 of the sensing assembly 100. It should be appreciated that while the crop distribution graphs of FIGS. 8A-8C are illustrated with respect to the sensing assembly 100, similar crop distribution graphs may be generated with respect to the sensing assembly 100'.

Figure 8A:
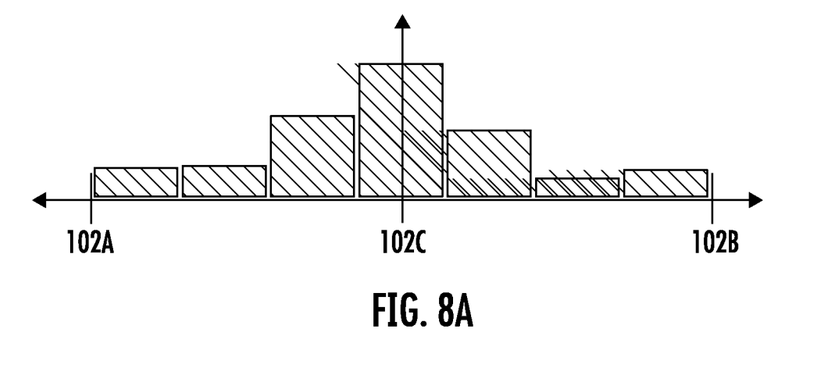
FIGS. 8A-8C illustrate exemplary distribution graphs of crop loss of an agricultural harvester in accordance with aspects of the present subject matter, particularly illustrating locations of crop loss impacts across a lateral width of a support beam of a sensing assembly.
Figure 8B:
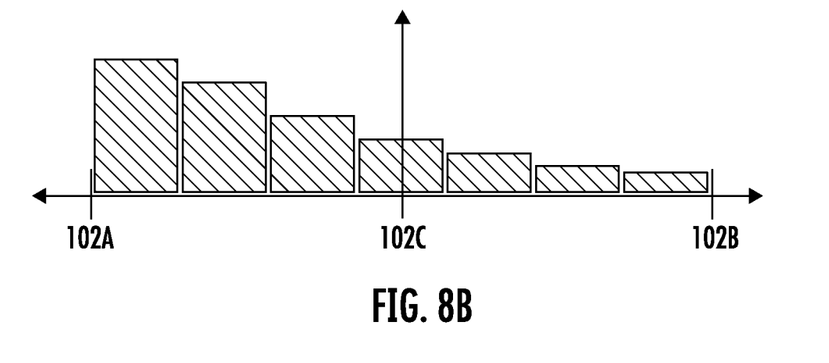
Figure 8C:
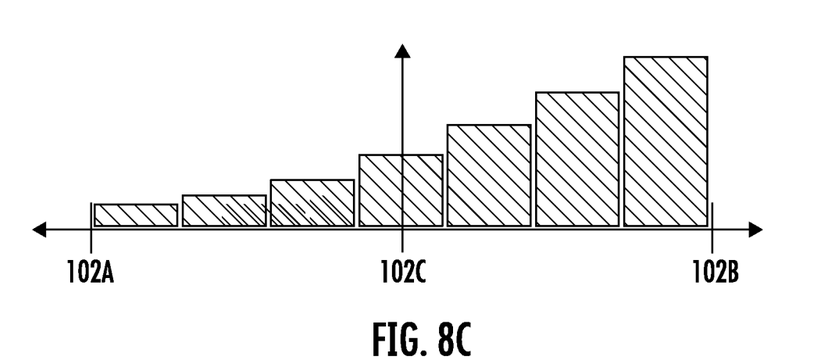

As shown in FIGS. 8A-8C, various operating settings or conditions of the agricultural harvester 10 may cause imbalanced crop loss distribution. For example, as shown in FIG. 8A, a majority of the crop loss may occur at or impact the center 102C of the support beam 102. Alternatively, as shown in FIGS. 8B and 8C, the crop loss may be focused towards one of the lateral ends of the support beam 102. For instance, as shown in FIG. 8B, a majority of the crop loss occurs closer to the first lateral end 102A of the support beam 102. Conversely, as shown in FIG. 8C, a majority of the crop loss occurs closer to the second lateral end 102B of the support beam 102. The imbalanced distribution of crop losses provide an indication of where the crop losses originate in the harvester 10.

As such, referring back to FIG. 7, the memory 206 of the computing system 202 may store instructions 214 that, when executed by the processor(s) 204, configure the computing system 202 to execute a control module 218 to reduce crop losses based at least in part on the locations of crop impacts across the support beam 102, 102'. For instance, the control module 218 may be configured to control an operation of the rotor drive 76 to adjust a rotational speed of the rotor 12, and/or the concave actuator(s) 78A, 78B to adjust the concave 46 (e.g., a position of the concave 46 about the rotational axis of the rotor 12 and/or an angle of vanes of the concave 46) in response to the crop losses being focused towards the center of the support beam 102, 102' as shown in FIG. 8A. For instance, the rotor drive 76 may be controlled to increase or decrease the rotational speed of the rotor 12; the first concave actuator(s) 78A may be controlled to move the concave 46 closer to the rotor to increase an aggressiveness of the threshing and separating assembly; and/or the second concave actuator(s) 78B may be controlled to change the degree of opening of the vanes of the concave 46 to create additional passes within the threshing and separating assembly.

Similarly, the control module 218 may be configured to control an operation of the leveling system 80 to adjust a positioning of the pans 48 and/or sieves 50 of the cleaning assembly in response to the crop losses being focused towards one of the lateral sides of the support beam 102, 102' as shown in FIGS. 8B and 8C. For instance, if the crop losses are higher towards the first lateral end 102A, 102A' of the support beam 102, 102' (similar to as shown in FIG. 8B), the leveling system 80 may be controlled to tilt the pans 48 and/or sieves 50 of the cleaning assembly such that the lateral side of the cleaning assembly proximate the first lateral side 102A, 102A' of the support beam 102, 102' is raised and/or the lateral side of the cleaning assembly proximate the second lateral side 102B, 102B' of the support beam 102, 102' is lowered. Conversely, if the crop losses are higher towards the second lateral end 102B, 102B' of the support beam 102, 102' (similar to as shown in FIG. 8C), the leveling system 80 may be controlled to tilt the pans 48 and/or sieves 50 of the cleaning assembly such that the lateral side of the cleaning assembly proximate the second lateral side 102B, 102B' of the support beam 102, 102' is raised and/or the lateral side of the cleaning assembly proximate the first lateral side 102A, 102A' of the support beam 102, 102' is lowered.

It should be appreciated that the automated control of the different parts of the harvester 10 in response to the distribution of the crop loss may additionally take into account further operating factors of the harvester 10 such as crop type, moisture content, and/or the like.

Alternatively, or additionally, in some embodiments, the control module 218 may be configured to control an operation of a user interface 220 associated with the agricultural harvester 10. In general, the user interface 220 may correspond to any suitable input device(s) configured to allow the operator to provide operator inputs to the computing system 202, such as a touch screen display, a keyboard, joystick, buttons, knobs, switches, and/or combinations thereof located within the cab 22 of the harvester 10. The operator may provide various inputs into the system 202 via the user interface 220. In one embodiment, suitable operator inputs may include, but are not limited to, a target rotor speed, a target concave position and/or vane angle, a lateral leveling of the cleaning assembly, and/or any other parameter associated with reducing crop loss of the harvester 10. In addition, the user interface 220 may also be configured to provide feedback (e.g., feedback associated with the location and/or distribution crop losses) to the operator. As such, the user interface 220 may include one or more output devices (not shown), such as display screens, speakers, warning lights, and/or the like, which are configured to provide feedback from the computing system 202 to the operator. For example, the computing system 202 may control an operation of the user interface 220 to indicate to the operator of the harvester 10 the locations and/or distribution of the crop loss and/or suggested actions to reduce crop loss.

It should be appreciated that the computing system 202 may also include various other suitable components, such as a communications circuit or module 222, a network interface, one or more input/output channels, a data/control bus and/or the like, to allow the computing system 202 to be communicatively coupled with any of the various other system components described herein.

Figure 9:
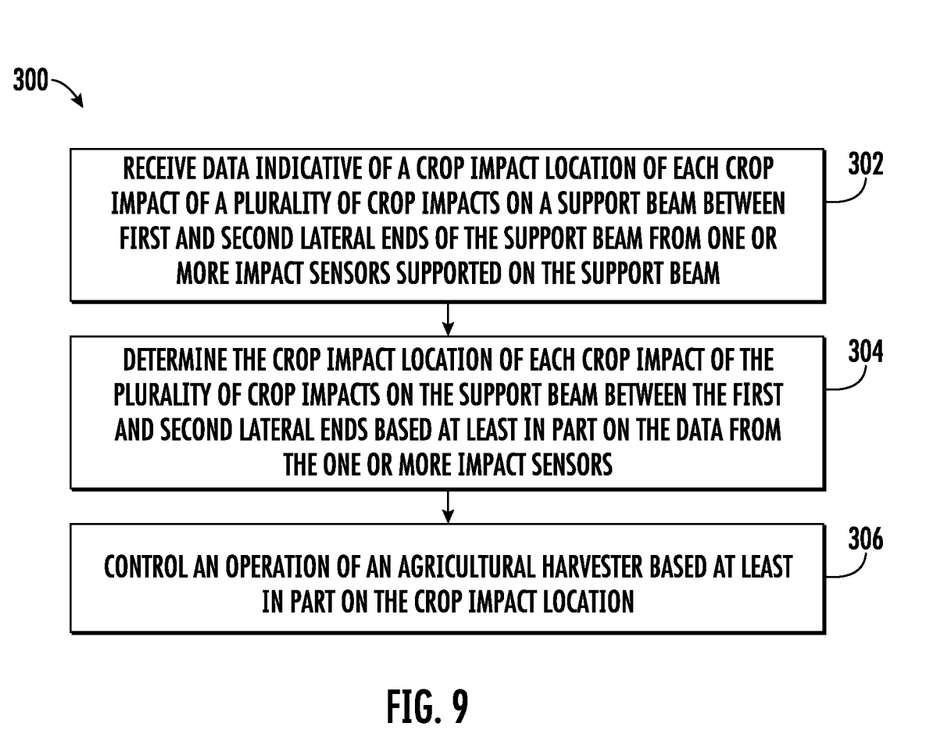
FIG. 9 illustrates a flow diagram of one embodiment of a method for determining crop loss of an agricultural harvester in accordance with aspects of the present subject matter.

Referring now to FIG. 9, a flow diagram of one embodiment of a method 300 for determining crop loss of an agricultural harvester (e.g., harvester 10) is illustrated in accordance with aspects of the present subject matter. For purposes of discussion, the method 300 will generally be described herein with reference to the harvester 10 described with reference to FIG. 1, the crop loss sensing assembly(ies) 100, 100' described with reference to FIGS. 2-6, and the computing system 202 described with reference to FIG. 7. However, it should be appreciated that the disclosed method 300 may be used with any suitable agricultural work vehicle having any other suitable vehicle configuration, with a sensing assembly having any other suitable configuration, and/or with a computing system 202 having any other suitable system configuration. Additionally, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (302) the method 300 includes receiving data indicative of a crop impact location of each crop impact of a plurality of crop impacts on a support beam between first and second lateral ends of the support beam from one or more impact sensors supported on the support beam. For instance, as discussed above, the computing system 202 may receive data indicative of the crop impact location of each crop impact of a plurality of crop impacts on the support beam 102, 102' from the impact sensor(s) 104A, 104B, 104' supported on the support beam 102.

Further, at (304), the method 300 includes determining the crop impact location of each crop impact of the plurality of crop impacts on the support beam between the first and second lateral ends based at least in part on the data from the one or more impact sensors. For example, as indicated above, the computing system 202 may be configured to determine the crop impact location of each crop impact of the plurality of crop impacts on the support beam 102, 102' between the first and second lateral ends 102A, 102B; 102A', 102B' based at least in part on the data from the impact sensor(s) 104A, 104B, 104'.

Additionally, at (306), the method 300 includes controlling an operation of an agricultural harvester based at least in part on the crop impact location. For instance, as discussed above, if the crop impact locations are skewed toward the center 102C, 102C' of the support beam 102, 102', the computing system 102 may control an operation of the rotor drive 76 and/or the concave actuator(s) 78A, 78B. Conversely, if the crop impact locations are skewed toward one of the lateral ends 102A, 102B; 102A', 102B' of the support beam 102, 102', the computing system 102 may control an operation of the leveling system 80. Additionally, or alternatively, the computing system 102 may control an operation of the user interface 220 based at least in part on the crop impact locations.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for determining crop loss of an agricultural harvester, the agricultural system comprising:
    a support beam extending along a lateral direction between a first lateral end and a second lateral end of the support beam, the support beam being positioned at a material-other-than-grain (MOG) outlet of the agricultural harvester;
    one or more impact sensors supported on the support beam, the one or more impact sensors comprising a first impact sensor supported on the support beam proximate the first lateral end of the support beam and a second impact sensor supported on the support beam proximate the second lateral end of the support beam, the second impact sensor being spaced apart from the first impact sensor along the lateral direction, each of the one or more impact sensors being at least one of a vibration sensor or an acoustic sensor, each of the one or more impact sensors generating data indicative of a magnitude of vibrations of the support beam in response to each crop impact of a plurality of crop impacts on the support beam between the first and second lateral ends, the magnitude of the vibrations of the support beam being indicative of a crop impact location of each crop impact of the plurality of crop impacts on the support beam between the first and second lateral ends, the plurality of crop impacts being caused by crop leaving the agricultural harvester through the MOG outlet; and
    a computing system communicatively coupled to the one or more impact sensors, the computing system determining the crop impact location of each crop impact of the plurality of crop impacts on the support beam between the first and second lateral ends based at least in part on a comparison of the data from the first and second one or more impact sensors.

2. The agricultural system of claim 1, wherein the data from the first impact sensor comprises a first time instance associated with the magnitude of the vibrations of the support beam for each crop impact,
    wherein the data from the second impact sensor comprises a second time instance associated with the magnitude of the vibrations of the support beam for each crop impact, and
    wherein the computing system determines that the crop impact location of a respective crop impact of the plurality of crop impacts is closer to the first lateral end of the support beam than the second lateral end of the support beam when the first time instance associated with the respective crop impact is earlier than the second time instance associated with the respective crop impact or closer to the second lateral end of the support beam than the first lateral end of the support beam when the second time instance associated with the respective crop impact is earlier than the first time instance associated with the respective crop impact.

3. The agricultural system of claim 1, wherein the support beam has a constant, c-shaped cross-sectional profile between the first and second lateral ends of the support beam.

4. The agricultural system of claim 1, wherein the computing system further determines a distribution of the crop impact locations of the plurality of crop impacts on the support beam along the lateral direction based at least in part on the crop impact location of each crop impact of the plurality of crop impacts on the support beam.

5. The agricultural system of claim 4, wherein the computing system controls an operation of a leveling system of the agricultural harvester based at least in part on the distribution of the crop impact locations.

6. The agricultural system of claim 4, wherein the computing system controls an operation of a threshing and separating assembly based at least in part on the distribution of the crop impact locations.

7. An agricultural method for determining crop loss of an agricultural harvester, the agricultural method comprising:
    receiving, with a computing system, data from one or more impact sensors supported on a support beam, the support beam being positioned at a material-other-than-grain (MOG) outlet of the agricultural harvester, the one or more impact sensors comprising a first impact sensor supported on the support beam proximate the first lateral end of the support beam and a second impact sensor supported on the support beam proximate the second lateral end of the support beam, the second impact sensor being spaced apart from the first impact sensor along the lateral direction, each of the one or more impact sensors being at least one of a vibration sensor or an acoustic sensor, the support beam extending along a lateral direction between a first lateral end and a second lateral end of the support beam, the data being indicative of a magnitude of vibrations of the support beam in response to each crop impact of a plurality of crop impacts on the support beam between the first and second lateral ends, the magnitude of the vibrations of the support beam being indicative of a crop impact location of each crop impact of the plurality of crop impacts on the support beam between the first and second lateral ends, the plurality of crop impacts being caused by crop leaving the agricultural harvester through the MOG outlet;
    determining, with the computing system, the crop impact location of each crop impact of the plurality of crop impacts on the support beam between the first and second lateral ends based at least in part on a comparison of the data from the first and second impact sensors; and
    controlling, with the computing system, an operation of the agricultural harvester based at least in part on the crop impact locations.

8. The agricultural method of claim 7, wherein the data from the first impact sensor comprises a first time instance associated with the magnitude of the vibrations of the support beam for each crop impact, and wherein the data from the second impact sensor comprises a second time instance associated with the magnitude of the vibrations of the support beam for each crop impact, and wherein determining the crop impact location based at least in part on the comparison of the data from the first and second impact sensors comprises determining that the crop impact location of a respective crop impact of the plurality of crop impacts is closer to the first lateral end of the support beam than the second lateral end of the support beam when the first time instance is earlier than the second time instance or closer to the second lateral end of the support beam than the first lateral end of the support beam when the second time instance associated with the respective crop impact is earlier than the first time instance associated with the respective crop impact.

9. The agricultural method of claim 7, wherein controlling the operation of the agricultural harvester comprises controlling an operation of a leveling system of the agricultural harvester based at least in part on the distribution of the crop impact locations.

10. The agricultural method of claim 7, wherein controlling the operation of the agricultural harvester comprises controlling an operation of a threshing and separating assembly based at least in part on the distribution of the crop impact locations.

11. The agricultural system of claim 1, wherein the support beam has a c-shaped cross-sectional profile, the one or more impact sensors being positioned within a recess defined by the c-shaped cross-sectional profile.

* * * * *